(12) United States Patent
Yagi et al.

(10) Patent No.: US 9,548,545 B2
(45) Date of Patent: Jan. 17, 2017

(54) CRIMP TERMINAL, AND METHOD AND APPARATUS FOR MANUFACTURING A CRIMP TERMINAL

(71) Applicants: Furukawa Electric Co., Ltd., Tokyo (JP); Furukawa Automotive Systems Inc., Shiga (JP)

(72) Inventors: Saburo Yagi, Tokyo (JP); Yasushi Kihara, Tokyo (JP); Yukihiro Kawamura, Tokyo (JP)

(73) Assignees: FURUKAWA AUTOMOTIVE SYSTEMS INC., Shiga (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/832,228

(22) Filed: Aug. 21, 2015

(65) Prior Publication Data

US 2015/0364836 A1 Dec. 17, 2015

Related U.S. Application Data

(63) Continuation of application No. PCT/JP2014/054389, filed on Feb. 24, 2014.

(30) Foreign Application Priority Data

Feb. 22, 2013 (JP) ................................. 2013-033939

(51) Int. Cl.
*H01R 4/18* (2006.01)
*H01R 43/02* (2006.01)
(Continued)

(52) U.S. Cl.
CPC ........... *H01R 4/187* (2013.01); *B23K 26/0846* (2013.01); *B23K 26/262* (2015.10); *B23K 26/32* (2013.01);
(Continued)

(58) Field of Classification Search
CPC ........... H01R 4/18; H01R 4/183–4/185; H01R 4/187; H01R 43/0221; H01R 43/0249; B23K 26/1476; B23K 26/0656; B23K 26/365; B23K 26/381; B23K 26/063
(Continued)

(56) References Cited

U.S. PATENT DOCUMENTS 3,302,281 A 2/1967 Freeman et al.
4,466,689 A 8/1984 Davis et al.
(Continued)

FOREIGN PATENT DOCUMENTS

JP H07-161448 A 6/1995
JP H08-174249 A 7/1996
(Continued)

OTHER PUBLICATIONS

English translation of Written Opinion for PCT/JP2014/054389 dated May 27, 2014.
(Continued)

*Primary Examiner* — Gary Paumen
(74) *Attorney, Agent, or Firm* — Thompson Coburn LLP

(57) ABSTRACT

A method for manufacturing a crimp terminal having a crimp portion adapted to allow crimp connection with a coated wire having a conductor and an insulating coating, the crimp portion being adapted to crimp connect along the coated wire from a portion of the conductor coated with the insulating coating to a portion of the conductor exposed from the insulating coating at a tip of the coated wire includes providing a barrel member formed by arranging edges of a copper alloy plate material side-by-side, the barrel member having a diameter reducing on an end portion side in a longitudinal direction from a coating crimp portion, forming the crimp portion by welding the edges by laser
(Continued)

irradiation from a laser irradiation unit onto a position where the edges are arranged side-by-side, while moving a laser light irradiation position in a longitudinal direction of the barrel member, and irradiating laser light with an output power density and a sweep rate for causing fine molten metal particles having a diameter of 60 μm or less to ejected from the weld portion during laser welding to adhere to an inner surface of the barrel member.

7 Claims, 4 Drawing Sheets

(51) Int. Cl.
  *B23K 26/08* (2014.01)
  *B23K 26/32* (2014.01)
  *H01R 43/048* (2006.01)
  *H01R 4/62* (2006.01)
  *H01R 43/16* (2006.01)

(52) U.S. Cl.
  CPC .......... *H01R 4/183* (2013.01); *H01R 43/0221* (2013.01); *H01R 43/048* (2013.01); *B23K 2201/38* (2013.01); *B23K 2203/08* (2013.01); *B23K 2203/12* (2013.01); *H01R 4/62* (2013.01); *H01R 43/16* (2013.01); *Y10T 29/49215* (2015.01); *Y10T 29/53235* (2015.01)

(58) Field of Classification Search
  USPC ................ 439/877–882; 219/121.67–121.72, 219/121.61; 29/860, 861, 863, 865, 866
  See application file for complete search history.

(56) References Cited

U.S. PATENT DOCUMENTS

| | | | | |
|---|---|---|---|---|
| 5,207,672 | A * | 5/1993 | Roth | A61B 18/24 600/439 |
| 5,409,537 | A * | 4/1995 | Poullos | C09D 5/1668 118/641 |
| 8,278,591 | B2 * | 10/2012 | Chouf | B23K 26/0648 219/121.61 |
| 2001/0003687 | A1 | 6/2001 | Kondo | |
| 2011/0083324 | A1 | 4/2011 | Martauz et al. | |
| 2014/0273667 | A1 * | 9/2014 | Tachibana | H01R 43/048 439/877 |
| 2015/0064991 | A1 | 3/2015 | Kawamura et al. | |
| 2015/0126078 | A1 * | 5/2015 | Kawamura | H01R 43/005 439/874 |
| 2015/0357723 | A1 * | 12/2015 | Tachibana | C25D 7/00 439/878 |
| 2015/0357724 | A1 * | 12/2015 | Okuno | C25D 7/00 439/877 |
| 2015/0364837 | A1 * | 12/2015 | Yagi | H01R 4/187 439/879 |

FOREIGN PATENT DOCUMENTS

| | | |
|---|---|---|
| JP | 2001-167821 A | 6/2001 |
| JP | 2011-115852 A | 6/2011 |
| JP | 2011-224655 A | 11/2011 |
| JP | 2012-069449 A | 4/2012 |
| KR | 10-2014-0111705 A | 9/2014 |
| KR | 10-2014-0114027 A | 9/2014 |
| KR | 10-2014-0130561 A | 11/2014 |

OTHER PUBLICATIONS

English translation of International Preliminary Report on Patentability (Chapter I) for PCT/JP2014/054389 dated Aug. 25, 2015.
International Search Report and Written Opinion dated May 27, 2014 for PCT/JP2014/054389.
Office Action dated May 19, 2014 for corresponding Japanese Patent Application No. 2014-512566.
Decision to Grant a Patent dated Jul. 7, 2014 for corresponding Japanese Patent Application No. 2014-512566.
Office Action dated Nov. 26, 2014 for corresponding Korean Patent Application No. 10-2014-7028807.
Notice of Allowance dated Jan. 26, 2015 for corresponding Korean Patent Application No. 10-2014-7028807.
Extended European Search Report for EP Application 14754925.7 dated Oct. 21, 2016.

* cited by examiner

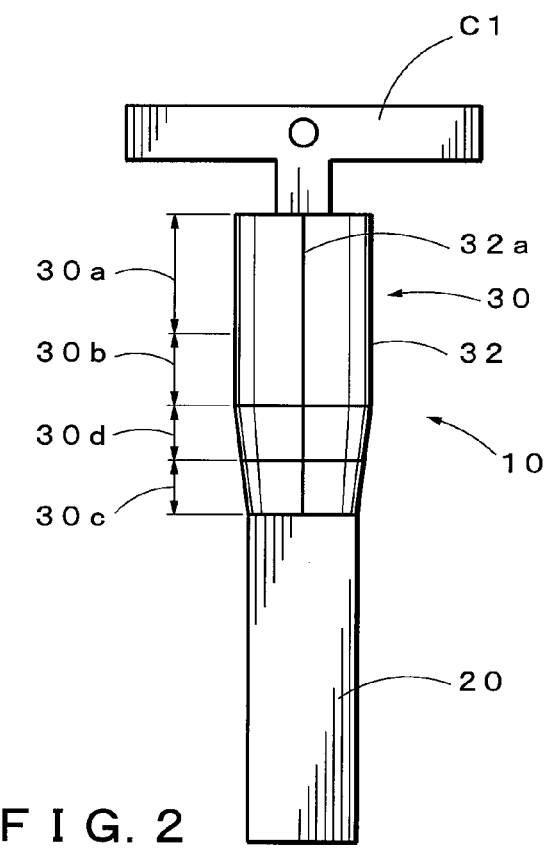
F I G. 2
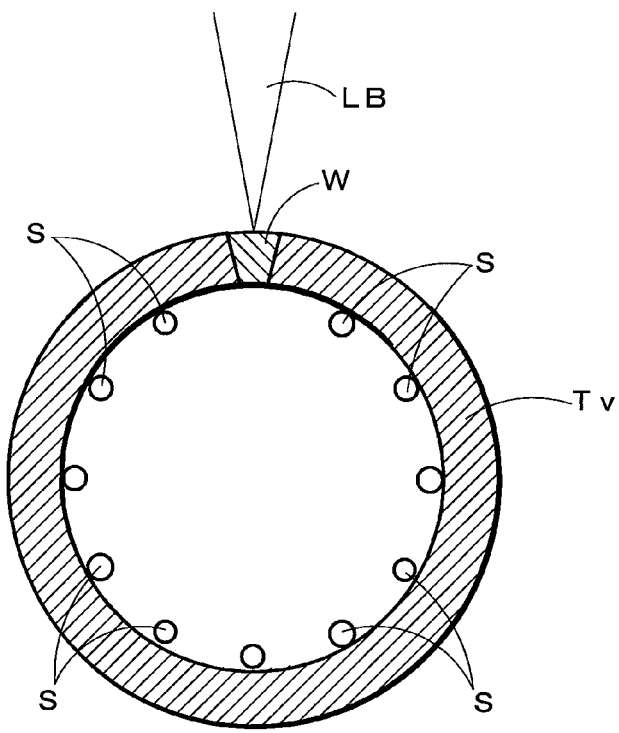
F I G. 5

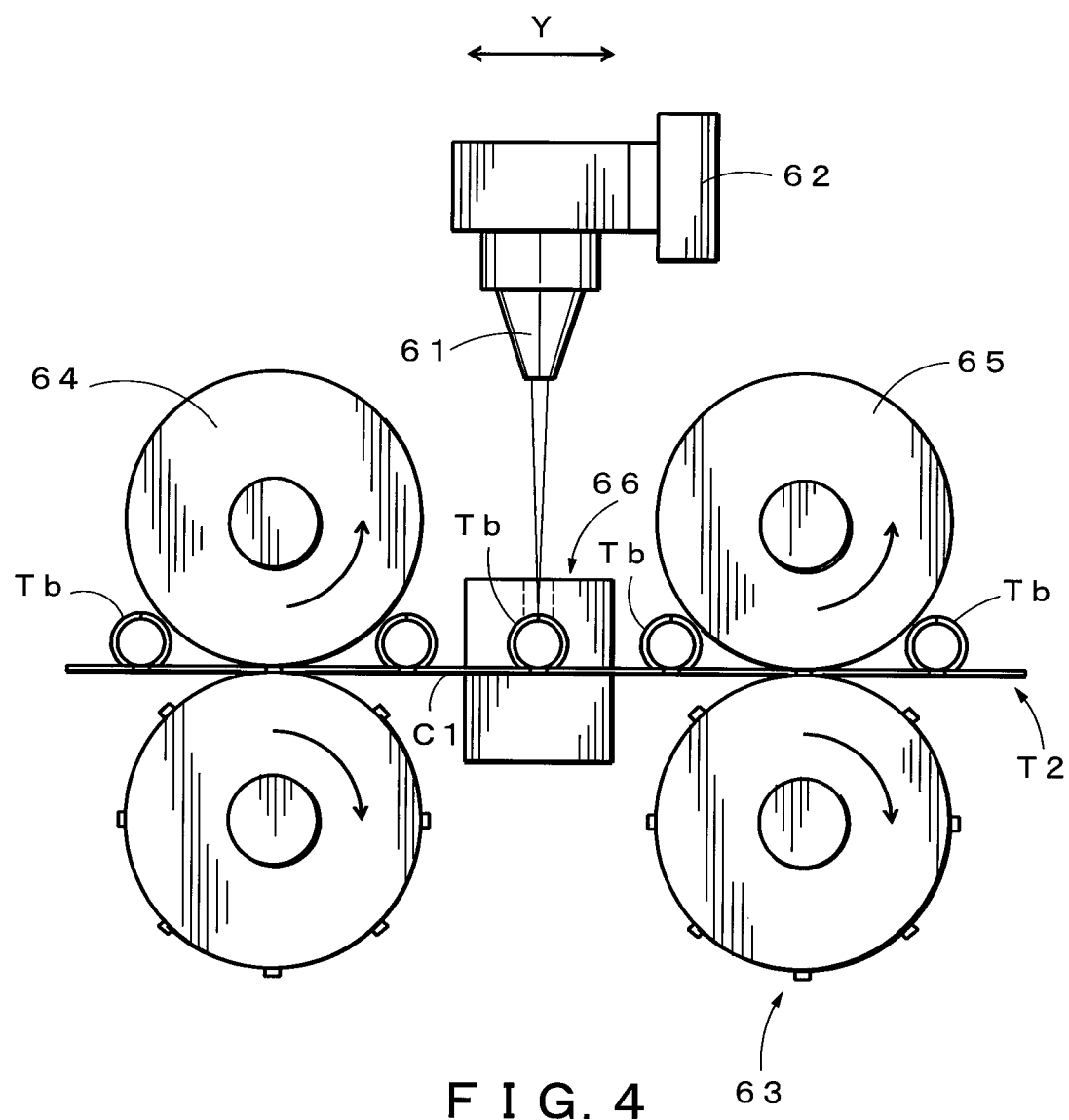
F I G. 4

CRIMP TERMINAL, AND METHOD AND APPARATUS FOR MANUFACTURING A CRIMP TERMINAL

CROSS REFERENCE TO RELATED APPLICATIONS

This is a continuation application of International Patent Application No. PCT/JP2014/054389 filed Feb. 24, 2014, which claims the benefit of Japanese Patent Application No. 2013-033939, filed Feb. 22, 2013, the full contents of all of which are hereby incorporated by reference in their entirety.

BACKGROUND

Technical Field

The present disclosure relates to a crimp terminal which provides connection in an automobile wire harness, and to a method and an apparatus for manufacturing same.

Background

Wire harnesses are often used for internal wiring of automobiles. A wire harness is a module in which a plurality of coated wires are assembled in accordance with in-vehicle wiring specifications. Crimp terminals, for example, are crimped to ends of each of the coated wires. When connecting a crimp terminal to a wire end of the wire harness, electrical connection between the wire end and the crimp terminal is provided by stripping the insulating coating layer at a wire end to expose the core wire, and swaging and crimping a core wire barrel of the crimp terminal to the exposed portion of the core wire. The connecting portion between the crimp terminal and the wire end is sealed with resin so as to prevent corrosion of the core wire due to ingress of moisture into the wire from the connecting portion (see Japanese Laid-Open Patent Publication No. 2001-167821 and Japanese Laid-Open Patent Publication No. 2012-069449).

However, sealing the connecting portion of the crimp terminal and the wire end with resin gives rise to an increase in the manufacturing cost of the wire harness. This is because, in addition to the fact that the resin used is expensive in itself, time is required to apply and cure the resin in a resin molding process or a coating process.

Therefore, attempts have been made to obtain a sealed structure for the wire connecting portion (crimp portion) of the crimp terminal by bending the wire connecting portion into a tubular shape by press molding, and joining the entire butted interface between the respective ends of the plate material formed at the tubular-shaped bent part by laser welding.

When crimping a crimp terminal with a coated wire from which the conductor portion, such as a core wire, is exposed, it is necessary that the conductor portion has continuity with the crimp terminal. There may be a case where the surface of the conductor portion is covered with an oxide film. Since an oxide film is non-conducting, if the surface of the conductor portion is covered with an oxide film, there is a problem that it becomes difficult to ensure a conducting state between the core wire and the crimp terminal.

Therefore, the present disclosure is related to providing a method and an apparatus for manufacturing a crimp terminal capable of achieving a good state of conduction between a conductor portion of a coated wire and a crimp terminal.

SUMMARY

According to a first aspect of the present disclosure, a method for manufacturing a crimp terminal comprises bending a metal plate material having opposite side edges to form a barrel member such that the side edges are adjacent each other. The metal plate material comprises a copper alloy. The barrel member has a first end portion and a second end portion, the first end portion having a first diameter and the second end portion having a second diameter. The second diameter is less than the first diameter. The method further comprises forming a crimp portion by welding the side edges of the barrel member with each other via laser irradiation performed by a laser irradiation unit irradiating laser light along the adjacent side edges from a first region of the barrel member to a second region of the barrel member. The second region is spaced longitudinally from the first region. The laser irradiation unit irradiates the laser light with an output power density and a sweep rate to cause fine molten metal particles to adhere to an inner surface of the barrel member. The fine molten metal particles being particles have a particle diameter of 60 µm or less that are ejected during the welding of the side edges of the barrel member.

In the method for manufacturing a crimp terminal relating to the present disclosure, laser light is irradiated from a laser irradiation unit with an output power density and a sweep rate for causing fine molten metal particles ejected from the weld portion during the laser welding to adhere to an inner surface of the barrel member. Consequently, after the laser welding has finished, fine molten metal adheres to the inner surface of the barrel member. The fine molten metal that has adhered to the inner surface of the barrel member subsequently solidifies and adheres to the inner surface of the barrel member in the form of fine metal particles. With these fine metal particles being adhered to the inner surface of the barrel member, when crimping and connecting the conductor portion of the coated wire to the crimp portion formed by the barrel member, the oxide film covering the surface of the conductor is broken by the fine metal particles, and the conductor portion comes to an exposed state. Consequently, it is possible to achieve a good state of conduction between the conductor portion of the coated wire and the crimp portion of the crimp terminal after crimping connection.

Here, the output power density and the sweep rate for causing fine molten metal particles ejected from the weld portion during the laser welding to adhere to the inner surface of the barrel member can be respectively set such that the output power density takes a value in a range of 5 to 400 MW/cm$^2$ and the sweep rate takes a value in a range of 90 to 500 mm/sec, in a case where a beam spot diameter is approximately 20 to 100 µm and a laser wavelength is 1.064 to 1.084 µm.

By setting the output power density and the sweep rate during the laser welding such that the output power density takes a value in a range of 5 to 400 MW/cm$^2$ and the sweep rate takes a value in a range of 90 to 500 mm/sec, in a case where a beam spot diameter is approximately 20 to 100 µm and the laser wavelength is 1.064 to 1.084 µm, it is possible to cause a suitable amount of fine molten metal to adhere to the surface of the barrel member.

On the other hand, the apparatus for manufacturing a crimp terminal described above is used performing in a method for manufacturing the crimp terminal described above and includes a laser irradiation unit and a laser irradiation positioning unit. The laser irradiation unit is adapted to irradiate laser light onto an irradiation region of a barrel member. The positioning unit is adapted to position laser light irradiated by the laser irradiation unit along adjacent side edges of the barrel member of a terminal so as to weld the adjacent side edges with each other. The laser irradiation unit is adapted to irradiate laser light with an output power density and a sweep rate to cause fine molten metal particles to adhere to an inner surface of the barrel member. The fine molten metal particles are particles having a particle diameter of 60 µm or less and that are ejected during the welding of the side edges of the barrel member.

According to another aspect of the present disclosure, a crimp terminal comprises a barrel member having a crimp portion and a plurality of fine metal particles. The barrel member comprises a copper alloy. The barrel member has a welded portion, a first end portion and a second end portion. The first end portion has a first diameter and the second end portion has a second diameter, the second diameter being less than the first diameter. The crimp portion is adapted to be crimped onto a wire having an insulated portion and an exposed portion at a tip of the wire. The plurality of fine metal particles adhere to an inner surface of the barrel member. The plurality of fine metal particles have a particle diameter of 60 µm or less.

According to the method and apparatus for manufacturing a crimp terminal relating to the present disclosure, it is possible to achieve a good state of conduction between a conductor portion of a coated wire and a crimp portion.

BRIEF DESCRIPTION OF DRAWINGS

FIG. 2 is a plan view of a crimp terminal.

FIG. 4 is a side view schematically showing a laser welding device.

FIG. 5 is a schematic cross-sectional diagram of a barrel portion when welding a butted interface.

DETAILED DESCRIPTION

Figure 1:
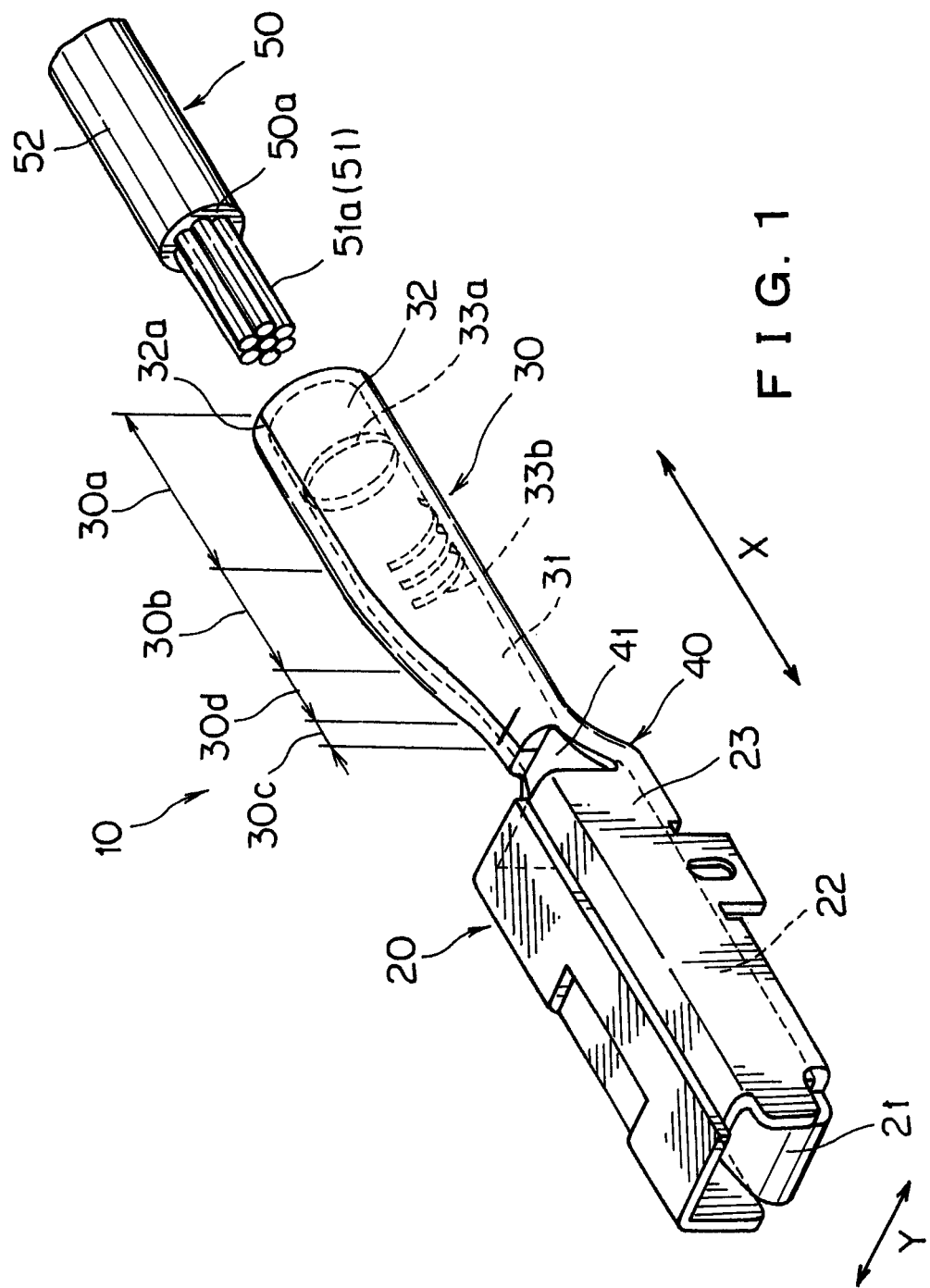
FIG. 1 is a perspective view showing a state where a coated wire is connected to a crimp terminal.

Hereinafter, a preferred embodiment of the present disclosure will be described. FIG. 1 is a perspective view showing a state where a coated wire is connected to a crimp terminal, and FIG. 2 is a plan view of a crimp terminal.

As shown in FIG. 1, a crimp terminal 10 manufactured by a manufacturing method according to the present embodiment is a female crimp terminal having a box portion 20 and a crimp portion 30. The crimp portion 30 of the crimp terminal 10 allows crimp connection with an aluminum core wire 51, which is a conductor portion of the coated wire 50, and the coated wire 50 is crimped to the crimp portion 30. The coated wire 50 is connected to the crimp portion 30 of the crimp terminal 10. The coated wire 50 includes an aluminum core wire 51, wherein the aluminum core wire 51 is coated with an insulating coating 52. The aluminum core wire 51 is constituted by bundling aluminum wire strands together. An electric wire exposed portion 51a where the aluminum core wire 51 is exposed from the insulation coating 52 is formed in front of a coated tip end 50a of the coated wire 50. The aluminum core wire 51 is constituted by twisting aluminum alloy wires so as to have a cross-sectional area of 0.75 mm².

The box portion 20 of the crimp terminal 10 is configured into a box shape having an inverted hollow quadrangular prism shape. An elastic contact piece 21 is provided inside the box portion 20. The elastic contact piece 21 is bent back towards the rear in the longitudinal direction X, and makes contact with an insertion tab of a male terminal, not shown, which is inserted into the box portion 20. Further, the box portion 20 is configured into a substantially rectangular shape as viewed from the tip end side in the longitudinal direction X, by bending its side surface portions 23 provided on either side of a bottom surface portion 22 in a width direction Y which is orthogonal to the longitudinal direction X so as to overlap each other.

In the present embodiment, the longitudinal direction X is a direction that coincides with a longitudinal direction of the coated wire 50 to which the crimp portion 30 is crimped and connected, and the width direction Y is a direction that intersects with the longitudinal direction X in a substantially horizontal plane, as shown in FIG. 1. The side of the box portion 20 towards the crimp portion 30 is referred to as the front, and the side of the crimp portion 30 towards the box portion 20 is referred to as the rear. Further, a reverse face side inclined portion 41 that inclines upward toward the rear is formed in a coupling portion 40 which couples the box portion 20 and the crimp portion 30 to each other.

Before being crimped, the crimp portion 30 of the crimp terminal 10 is formed as a tubular body by butting an end portions 32a of a crimping surface 31 and an end portions 32a of the crimp surface 31 extending on either side in the width direction Y of a curled barrel forming piece 32, and welding the end portions 32a together, as shown in FIG. 2. The crimp portion 30 is in substantially an O-shape as viewed from the rear. The length of the barrel forming pieces 32 in the longitudinal direction X is formed to be greater than the exposed length in the longitudinal direction X of the exposed wire portion 51a which is exposed on the front side of the longitudinal direction X, from the coating front end 52a, which is the front end of the insulating coating 50 on the front side in the longitudinal direction X. When the cross-sectional area of the aluminum core wire 51 is 2.5 sq (2.5 mm²), a crimp portion 30 having an inner diameter of 2.2 to 3.0 mm may be used, and when the cross-sectional area of the aluminum core wire 51 is 0.75 sq (0.75 mm²), a crimp portion 30 having an inner diameter of 1.4 to 2.0 mm may be used. Moreover, in order that the inner diameter of the crimp portion 30 varies approximately with the outer diameter of the wire conductor, in other words, in a range of approximately 1.0 to 2.5 mm, the shape of the crimp portion 30 may be formed as a stepped tube structure by a bending process.

The crimp portion 30 is provided with a coating crimp tubular portion 30a to which the insulating coating 50 shown in FIG. 1 is crimped, and a wire crimp tubular portion 30b that is disposed in front of the coating crimp tubular portion 30a and to which the electric wire exposed portions 51a of the aluminum core wires 51 are crimped. Further, a sealing portion 30c is formed further towards the front the wire crimp tubular portion 30b. The sealing portion 30c is deformed in such a manner that a front end portion thereof is squeezed into a substantially flat plate shape, and as shown in FIG. 2, is formed by welding in the width direction Y. An inclined portion 30d inclining downward toward the front is formed between the electric wire crimp tubular portion 30b and the sealing portion 30c. The crimp terminal 10 is configured as a closed-barrel terminal with the hollow quadrangular prism box portion 20 and the crimp portion 30 that is in substantially an O-shape as viewed from the rear.

A coating locking groove 33a, which is a groove in the width direction Y, is formed on an inner surface of the coating crimp tubular portion 30a in the crimp portion 30. The coating locking groove 33a forms a continuous ring-shaped groove along the entire circumference of the crimp surface 31. Such shape of the locking grooves for coating 33a causes the insulation coating 50 to enter into these grooves when crimped to the crimp portion 30.

Three wire locking grooves 33b, which are grooves in the width direction Y, are formed at predetermined intervals along the longitudinal direction X on the inner surface of the wire crimp tubular portion 30b. The cross section of each of the wire locking grooves 33b is in the shape of a rectangular recess, and the wire locking grooves 33b configure annular grooves continuing to the middle of the crimp surface 31 in its circumferential direction. Such shape of the wire locking grooves 33b causes the aluminum core wires 51 to enter into the wire locking grooves 33b when crimped to the crimp portion 30. Such a configuration improves the conductivity between the crimp portion 30 and the aluminum core wires 51.

Figure 3A:
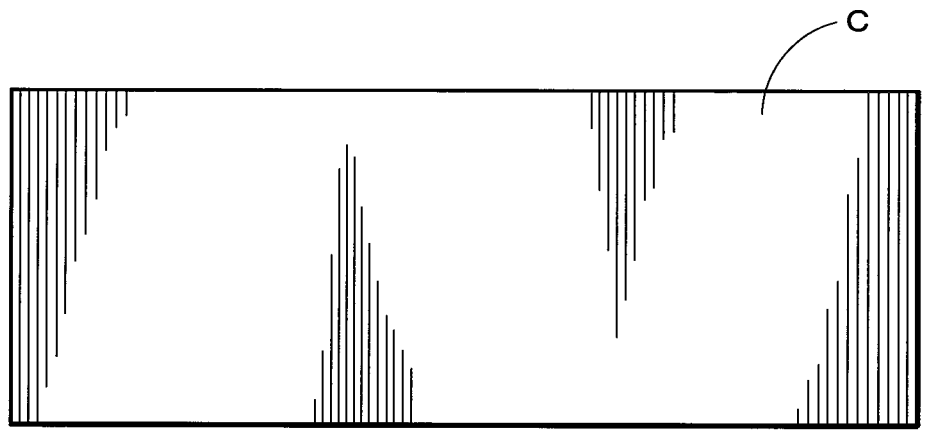
FIG. 3A is a plan view showing a copper strip.

Next, a method for manufacturing a crimp terminal according to the present embodiment will be described. Firstly, a copper strip C shown in FIG. 3A is subject to a pressing step by a pressing device and a welding step by a laser welding device to manufacture the crimp terminal 10 shown in FIG. 1 and FIG. 2. The copper strip C is an untreated metal plate material made from a copper alloy strip, such as brass strip, having a surface plating of tin (Sn-plating). As the untreated metal plate material, it is also possible to use a plate material or strip material made from a metal other than copper, such as a steel plate or an aluminum plate, instead of the copper strip C.

Figure 3B:
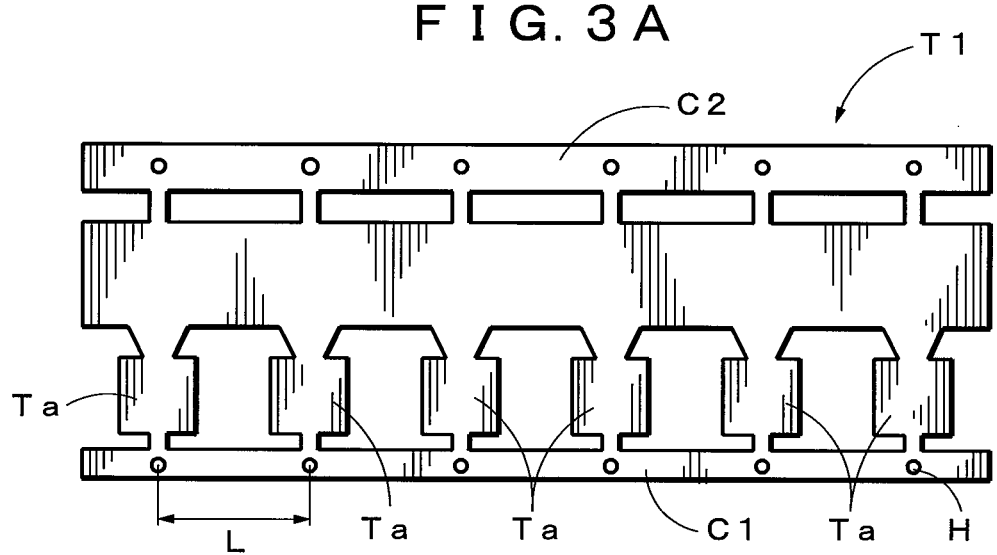
FIG. 3B is a plan view showing a chained terminal after preliminary pressing.

In the pressing step, as shown in FIG. 3B, a pre-final-pressing chained terminal T1 is formed by subjecting the copper strip C to a punching process. The pre-final-pressing chained terminal T1 is constituted by a plurality of pre-bending crimp terminals Ta, which become crimp terminals 10 after processing, and an upper carrier portion C1 and a lower carrier portion C2, which links together the plurality of pre-bending crimp terminals Ta and which are supported during transport. The upper carrier portion C1 is a belt-shaped holding member which is disposed above the pre-bending crimp terminals Ta. Further, the lower carrier portion C2 is disposed below the pre-bending crimp terminals Ta, which is a plate material.

Figure 3C:
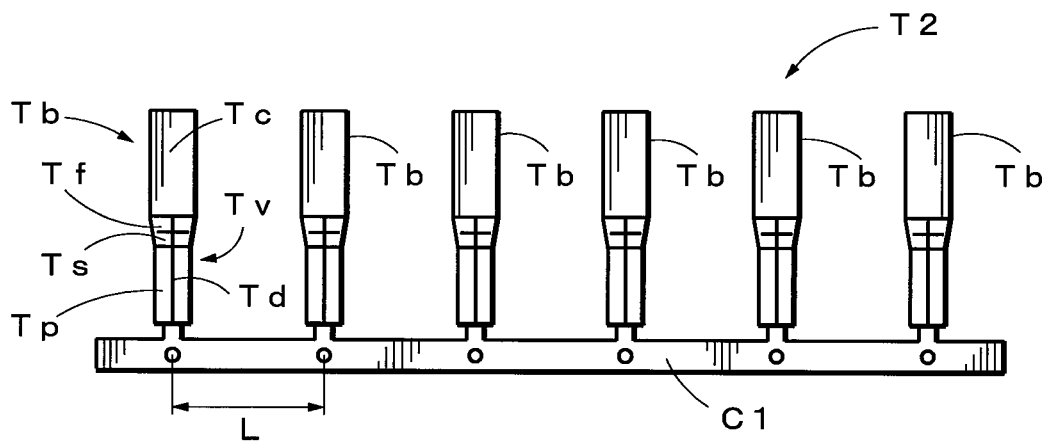
FIG. 3C is a plan view showing a chained terminal after secondary pressing.

Moreover, in the pressing process, the pre-bending crimp terminals Ta in the pre-final-pressing chained terminal T1 are subjected to a bending process in the pressing step, and as shown in FIG. 3C, pre-welding crimp terminals Tb provided with a barrel portion Tv which becomes a barrel member and a connector portion Tc are formed. Further, a chained terminal T2 is formed in which a plurality of pre-welding crimp terminals Tb are connected by the upper carrier portion. The barrel portion Tv is a tubular body which is formed by arranging the respective side edges of the barrel portion Tv side by side, and more specifically, is a tubular body in which the respective side edges are butted against each other. Thereupon, an end portion of the barrel portion Tv on the side of the connector portion Tc, which is one end in the longitudinal direction of the barrel portion Tv, is pressed and squeezed, and an opening portion of the barrel portion Tv on the connector portion Tc-side is closed to form a closed portion. Further, by squeezing the end portion of the barrel portion Tv, an inclined portion Ts is formed on the connector portion Tc-side, and the tube-shaped portion which remains without being squeezed becomes a tubular portion Tp. Further, the front end portion of the inclined portion Ts becomes a sealing portion Tf. Subsequently, in a welding step, the butted portion of the tubular portion Tp and the sealing portion Tf are welded by a laser welding device 3. In this way, the crimp terminal 10 as shown in FIG. 1 and FIG. 2 are manufactured.

Next, the configuration of the laser welding device will be described. FIG. 4 is a front view schematically showing a laser welding device. As shown in FIG. 4, the laser welding device 3 is provided with a laser machining head 61 adapted to irradiate laser light supplied from a laser light source, a laser machining head movement mechanism 62 adapted to move the laser machining head 61, and a conveying and positioning mechanism 63 adapted to convey and move the chained terminal T2 and also performs positioning during laser welding.

The laser machining head 61 irradiates fiber laser light having a wavelength of approximately 1.064 to 1.084 μm. The beam spot diameter in this case is approximately 20 to 100 μm. Further, the laser machining head movement mechanism 62 holds the laser machining head 61, as well as moving the laser machining head 61 along the longitudinal direction X of the tubular portion Tp of the pre-welding crimp terminal Tb. The conveying and positioning mechanism 63 is provided with rollers 64 and 65 which are disposed upstream of an irradiation position of the laser light which is irradiated from the laser machining head 61, and conveys the chained terminal T2.

When welding the butted interface Td, which becomes the weld portion of the tubular portion Tp, by a laser welding device, and when the laser light is irradiated from the laser machining head 61, a sputter, which is a fine molten metal, is ejected from the weld portion. The sputter is a molten metal, here, a copper alloy, that is a raw material of the tubular portion Tp. As shown in FIG. 5, the sputter S which is ejected from the weld portion W at the butted interface Td in the tubular portion Tp, by irradiating laser light LB, adheres to the inner surface of the tubular portion Tp in the barrel portion Tv.

The sputter S which has adhered to the inner surface of the tubular portion Tp cools and solidifies during the subsequent manufacturing steps of the crimp terminal 10. Therefore, at the time when the crimp terminal 10 shown in FIG. 1 is manufactured, a large number of fine metal particles are adhered to the inner surface of the crimp portion 30 of the crimp terminal 10 in a projected manner from the inner surface of the crimp portion 30.

When inserting the aluminum core wire 51 into the tubular portion Tp, when the surface of the aluminum core wire 51 is covered with an oxide film, the state of conduction between the aluminum core wire 51 and the crimp portion 30 in the crimp terminal 10 becomes poor. In order to avoid such poor state of conduction, in the related art, wire locking grooves 33b are formed in the tubular portion Tp and the oxide film on the surface of the aluminum core wire 51 is broken by the wire locking grooves 33b, so as to expose the aluminum core wire 51 itself.

In this respect, in the present embodiment, fine metal particles adhere to the inner surface of the crimp portion 30 which crimp the coated wire 50. Therefore, when the coated wire 50 is inserted into the crimp portion 30, the surface of the aluminum core wire 51 which is the conductor portion of the coated wire 50 rubs against the fine metal particles adhering to the inner surface of the crimp portion 30, and the surface of the aluminum core wire 51 is slightly damaged.

When the surface of the aluminum core wire 51 is slightly damaged, the oxide film covering the surface of the aluminum core wire 51 is scraped away, and the aluminum core wire 51 itself is exposed at the surface. Therefore, the aluminum core wire 51 and the crimp portion 30 in the crimp terminal 10 make contact so as to maintain a good state of conduction with the aluminum core wire 51 in the coated wire 50. Consequently, it is possible to achieve a good state of conduction between the conductor portion of the coated wire and the crimp terminal.

Here, an output power density of the laser light irradiated from the laser machining head 61 and a sweep rate of the laser light source are adjusted to values for causing sputter S ejected from the weld portion during the laser welding to adhere to the inner surface of the barrel portion Tv. The irradiation conditions of the laser light irradiated from the laser machining head 61 are, for example, when performing a penetration welding in such a manner that the welding depth at the butted interface Td is no less than the plate thickness, the beam spot diameter of the laser light irradiated from the laser machining head 61 is approximately 20 to 100 μm, and in a case where the laser wavelength is 1.064 to 1.084 μm, the output power density is in a range of 5 to 400 MW/cm$^2$ and the sweep rate is in a range of 90 to 500 mm/sec.

More specifically, for a case in which the beam spot diameter of the laser light is approximately 20 μm and the laser wavelength is 1.064 to 1.084 μm, when the output power density is 100 MW/cm$^2$ and the sweep rate is 130 mm/sec, it is possible to cause 60 metal particles per square millimeter to adhere to the inner surface of the crimp portion 30. Desirably, the area of the metal particles adhering in this way is no more than 10 percent per unit area. This is because if there are too many metal particles, the thickness of the weld portion may decrease. The area of the metal particles in this case is the area of the two-dimensional plane captured in an image. Further, the size of the metal particles in this case is in a range of 1 to 60 μm.

The number of particles and the particle size per unit area of the metal particles which adhere to the inner surface of the crimp portion 30 of the crimp terminal 10 depend on the output power density and the sweep rate of the laser light which is output from the laser machining head 61. It is possible to increase the number of particles per unit area by slowing the sweep rate or by increasing the output power density of the laser light. In a case where laser light is irradiated under the irradiation conditions described above, the size of the metal particles adhering to the inner surface of the crimp portion 30 of the crimp terminal 10 is 1 to 60 μm. The thickness of the oxide film on the aluminum core wire 51 is approximately 10 Ångstrom. Therefore, when crimping the coated wire 50 with the crimp terminal 10, the oxide film on the surface of the aluminum core wire 51 can be broken sufficiently by the metal particles adhering to the inner surface of the crimp portion 30. The thickness of the oxide film is not limited to the example described above (approximately 10 Angstrom) and may be several nanometers to several tens of nanometers approximately. Further, when the size of the metal particles becomes too large, the coating may be damaged or the coating may be peeled away, and therefore it is desirable for the metal particles to be smaller than approximately 60 μm in size.

In this way, when welding the butted interface Td of the tubular portion Tp in the barrel portion Tv by laser welding, it is possible to adjust the amount of sputter which is ejected and adheres to the inner surface of the tubular portion Tp, by adjusting the output power density of the laser light and the sweep rate of the laser light source. Consequently, metal particles for breaking the oxide film on the surface of the aluminum core wire 51 during crimping can be caused to adhere to the inner surface of the crimp portion 30, and a good state of conduction can be achieved between the conductor portion of the coated wire and the crimp terminal.

The preferred embodiment of the present disclosure has been described above, but the present disclosure is not limited to the embodiment. For example, in the embodiment described above, a crimp terminal 10 is constituted by a box portion 20 and a crimp portion 30, but provided that the crimp terminal has a crimp portion 30, it may be a male crimp terminal constituted by a crimp portion 30 and an insertion tab which is inserted into and connects with a box portion 20 on the crimp terminal 10 described above, or may be a crimp terminal which is used to bunch together and connect a plurality of aluminum core wires 51 and which is constituted by a crimp portion 30 only.

Moreover, although the crimp terminal 10 is made of a copper alloy, it may also be made of aluminum, or an aluminum alloy or another metal. Further, in the embodiment described above, respective side edges are disposed side by side with each other and are butted together, but the edges do not have to be butted and may be lapped with each other, for example. In this case, lap welding rather than butt welding is carried out. When performing lap welding, a penetration welding is performed in such a manner that a weld bead is created on the opposite side to the side where the laser light is irradiated. Further, in the embodiment described above, fine metal particles are caused to adhere to the inner surface of the crimp portion 30 and the formation of wire locking grooves can be omitted, but it is also possible to form wire locking grooves in addition to the adherence of small metal particles.

On the other hand, in the embodiment described above, a laser machining head is used in irradiating laser light supplied from a laser light source, as the laser irradiation unit, but it is also possible to employ another laser irradiation unit. For example, it is also possible to use a so-called galvanometer scanner which uses mirror reflection, or the like, to adjust the irradiation position of laser light supplied from a laser light source. In this case, the galvanometer scanner may also serve as a laser irradiation position movement unit.

Moreover, the present disclosure can also be applied to metal electric wires other than aluminum wires, such as copper wires, which require water-proofing and water-sealing treatments. Further, the electric wire cross-sectional area is not limited to 0.75 mm$^2$ and adaptation to electric wire cross-sectional areas larger or smaller than 0.75 mm$^2$ is also possible. Moreover, the surface plating of the material may be a metal plating other than Sn, and under-layer plating may also be employed. Further, there may be no locking grooves or a plurality of locking grooves. The locking groove has a recessed (groove)-shape, but it is also possible to form a protruded projection, instead of the recess-shaped locking groove. The cross-sectional shape of these locking grooves and projections may be a diamond shape, a parallelogram shape, a triangular shape, or a round shape.

What is claimed is:

1. A method for manufacturing a crimp terminal, the method comprising:
   bending a metal plate material having opposite side edges to form a barrel member such that the side edges are adjacent each other, the metal plate material comprising copper alloy, the barrel member having a first end portion and a second end portion, the first end portion having a first diameter, the second end portion having a second diameter, the second diameter being less than the first diameter;

forming a crimp portion by joining the side edges of the barrel member with each other via laser welding performed by a laser irradiation unit irradiating laser light along the adjacent side edges from a first region of the barrel member to a second region of the barrel member, the second region being spaced longitudinally from the first region, the laser irradiation unit irradiating the laser light with an output power density and a sweep rate to cause fine molten metal particles to adhere to an inner surface of the barrel member, the fine molten metal particles being particles having a particle diameter of 60 μm or less that are ejected during the welding of the side edges of the barrel member.

2. The method for manufacturing a crimp terminal according to claim 1, wherein the irradiated laser light has a beam spot diameter in a range of 20 μm to 100 μm and a laser wavelength in a range of 1.064 μm to 1.084 μm, and the output power density is in a range of 5 MW/cm$^2$ to 400 MW/cm$^2$ and the sweep rate is in a range of 90 mm/sec to 500 mm/sec.

3. A crimp terminal manufacturing apparatus comprising a laser irradiation unit and a positioning unit, the laser irradiation unit being adapted to irradiate laser light onto an irradiation region of a barrel member, the positioning unit being adapted to position laser light irradiated by the laser irradiation unit along adjacent side edges of the barrel member of a terminal so as to join the adjacent side edges with each other, the laser irradiation unit being adapted to irradiate laser light with an output power density and a sweep rate to cause fine molten metal particles to adhere to an inner surface of the barrel member, the fine molten metal particles being particles having a particle diameter of 60 μm or less and that are ejected during the welding of the side edges of the barrel member.

4. A crimp terminal comprising a barrel member having a crimp portion, the barrel member comprising a copper alloy, the barrel member having a welded portion at which adjacent side edges of the barrel member are jointed with each other, a first end portion and a second end portion, the first end portion having a first diameter, the second end portion having a second diameter, the second diameter being less than the first diameter, the crimp portion being adapted to be crimped onto a wire having a an insulated portion and an exposed portion at a tip of the wire; and
 a plurality of fine metal particles adhering to an inner surface of the barrel member, the plurality of fine metal particles having a particle diameter of 60 μm or less.

5. The method for manufacturing a crimp terminal according to claim 1, wherein the side edges of the barrel member are joined with each other by laser welding along an interface at which the side edges of the barrel member are butted with each other.

6. The crimp terminal manufacturing apparatus according to claim 3, wherein the adjacent side edges are joined with each other by laser welding along an interface at which the adjacent side edges are butted with each other.

7. The crimp terminal according to claim 4, wherein the adjacent side edges are joined with each other by laser welding along an interface at which the adjacent side edges are butted with each other.

* * * * *